(12) United States Patent
Qiu

(10) Patent No.: US 12,427,387 B2
(45) Date of Patent: Sep. 30, 2025

(54) THROWING CLUB WITH COUNTERWEIGHT AT HANDLE THEREOF

(71) Applicant: JIANGSU ZHONGHENG PET ARTICLES JOINT-STOCK CO., LTD., Yancheng (CN)

(72) Inventor: Bin Qiu, Yancheng (CN)

(73) Assignee: JIANGSU ZHONGHENG PET ARTICLES JOINT-STOCK CO., LTD., Yancheng (CN)

( * ) Notice: Subject to any disclaimer, the term of this patent is extended or adjusted under 35 U.S.C. 154(b) by 144 days.

(21) Appl. No.: 18/154,888

(22) Filed: Jan. 16, 2023

(65) Prior Publication Data
US 2023/0381617 A1 Nov. 30, 2023

(51) Int. Cl.
| | | |
|---|---|---|
| *A63B 65/12* | (2006.01) | |
| *A01K 15/02* | (2006.01) | |
| *A63B 60/08* | (2015.01) | |
| *A63B 60/12* | (2015.01) | |

(52) U.S. Cl.
CPC .......... *A63B 65/122* (2013.01); *A01K 15/025* (2013.01); *A63B 60/08* (2015.10); *A63B 60/12* (2015.10)

(58) Field of Classification Search
CPC .... A01K 15/025; A63B 65/122; A63B 60/08; A63B 60/12; A63B 59/02; A63B 65/12; A63B 60/06; A63B 60/22; A63B 60/24; B25G 1/102; F41B 3/00; F41B 3/04
USPC ....... 473/516, 235, 505, 510, 297, 519, 549, 473/551, 568
See application file for complete search history.

(56) References Cited

U.S. PATENT DOCUMENTS

| | | | | |
|---|---|---|---|---|
| 2,215,899 A | * | 9/1940 | Beasley ................. | A63B 60/06 473/519 |
| 2,576,751 A | * | 11/1951 | Dortmund ................ | B25G 1/00 473/551 |
| 4,179,121 A | * | 12/1979 | Kelmanski ............. | A63B 60/02 473/519 |
| 4,674,746 A | * | 6/1987 | Benoit ................... | A63B 60/24 473/297 |
| 5,716,289 A | * | 2/1998 | Okoneski ............... | A63B 60/54 473/297 |

(Continued)

FOREIGN PATENT DOCUMENTS

| | | | | |
|---|---|---|---|---|
| WO | WO-2017178900 A1 | * | 10/2017 | ........... A63B 65/122 |
| WO | WO-2022261711 A1 | * | 12/2022 | ............. A63B 59/20 |

*Primary Examiner* — Peter M Poon
*Assistant Examiner* — Angelica Alejandra Almeida Bonnin
(74) *Attorney, Agent, or Firm* — Cooper Legal Group, LLC

(57) ABSTRACT

A throwing club with a counterweight at a handle thereof includes a rod portion, the handle, and a ball holder. A first end of the rod portion is connected to the handle. The ball holder is arranged on a second end of the rod portion. An anti-releasing ring is arranged on the handle. A first slip-proof shell and a second slip-proof shell are arranged on an outer side of the handle. A streamlined casing for improving a comfort during gripping is arranged on an inner side of the handle. The counterweight is arranged inside an end of the handle away from the rod portion. The throwing club is of a simple structure and a skillful and reasonable design. The design of the anti-releasing ring on the handle can prevent the throwing club from being thrown out of the hand during the throwing process.

10 Claims, 4 Drawing Sheets

(56) References Cited

U.S. PATENT DOCUMENTS

| | | | | |
|---|---|---|---|---|
| 5,772,540 | A  * | 6/1998 | Kuebler | A63B 60/54 |
| | | | | 473/519 |
| 6,117,028 | A  * | 9/2000 | You | A63B 60/54 |
| | | | | 473/297 |
| 6,477,745 | B2 * | 11/2002 | Strebl | A63B 60/12 |
| | | | | 24/336 |
| 7,779,543 | B2 * | 8/2010 | Wang | B26B 21/52 |
| | | | | 30/526 |
| 8,007,379 | B1 * | 8/2011 | Cook | A63B 60/24 |
| | | | | 473/549 |
| 8,028,684 | B1 * | 10/2011 | Weissmann | F41B 3/03 |
| | | | | 124/5 |
| D666,686 | S  * | 9/2012 | Burger | D21/722 |
| 2002/0032086 | A1 * | 3/2002 | Li | A63B 60/06 |
| | | | | 473/516 |
| 2005/0188970 | A1 * | 9/2005 | Cuisinier | F41B 3/04 |
| | | | | 124/5 |
| 2008/0004140 | A1 * | 1/2008 | Matsumoto | A01K 15/025 |
| | | | | 473/513 |
| 2008/0127955 | A1 * | 6/2008 | Christ | F41B 3/04 |
| | | | | 124/5 |
| 2014/0378250 | A1 * | 12/2014 | Shocklee, Jr. | A63B 60/08 |
| | | | | 473/457 |
| 2015/0342146 | A1 * | 12/2015 | Tucker | A63B 47/02 |
| | | | | 124/79 |
| 2017/0112099 | A1 * | 4/2017 | Hartelius | A01K 15/025 |
| 2017/0209758 | A1 * | 7/2017 | Ivanic | A63B 59/20 |
| 2017/0258047 | A1 * | 9/2017 | Wills | A01K 15/027 |
| 2018/0056529 | A1 * | 3/2018 | Liu | B25G 1/00 |
| 2019/0335713 | A1 * | 11/2019 | Wills | A63B 59/20 |
| 2022/0168619 | A1 * | 6/2022 | Becker | A63B 60/12 |

* cited by examiner

THROWING CLUB WITH COUNTERWEIGHT AT HANDLE THEREOF

CROSS REFERENCE TO THE RELATED APPLICATIONS

This application is based upon and claims priority to Chinese Patent Applications No. 202221320847.4, filed on May 30, 2022, and No. 202221795334.9, filed on Jul. 13, 2022, the entire contents of which are incorporated herein by reference.

TECHNICAL FIELD

The present disclosure belongs to the technical field of pet products, and in particular relates to a throwing club with a counterweight at a handle thereof.

BACKGROUND

In today's society, more and more people start to keep pets. Keeping pets can make people have more fun in their spare time, and the interaction with pets can improve the living index of pet owners. Throwing clubs for pets are pet products used for the interaction between people and pets. Most of existing throwing clubs for pets are provided with a ball holder for throwing a ball at an end of the club. A user can put a pet ball into the ball holder, hold the club and vigorously swing it forward, to throw the ball out by inertia. However, a straight club, when swung vigorously, may be thrown out of the hand. In addition, due to the relatively large weight of the ball holder at the top and the relatively small weight of the handle, the stability of the swing is poor, making it difficult to throw the ball in a predetermined direction.

SUMMARY

An objective of the present disclosure is to overcome the deficiencies in the prior art, and provide a throwing club with a counterweight at a handle thereof, which is not easy to be thrown out of the hand and has a high stability.

The following technical solution is adopted in the present disclosure to solve the above technical problems.

A throwing club with a counterweight at a handle thereof is provided, including a rod portion, the handle, and a ball holder. A first end of the rod portion is connected to the handle. The ball holder is arranged on a second end of the rod portion. An anti-releasing ring is arranged on the handle. A first slip-proof shell and a second slip-proof shell are arranged on an outer side of the handle. A streamlined casing for improving a comfort during gripping is arranged on an inner side of the handle. The counterweight is arranged inside an end of the handle away from the rod portion.

Preferably, a first mounting block for mounting the first slip-proof shell is arranged on the outer side of the handle, and the first mounting block is provided with a first mounting hole; and a second mounting block for mounting the second slip-proof shell is arranged on a side of the first mounting block, and the second mounting block is provided with a second mounting hole.

Preferably, a third mounting block for mounting the streamlined casing is arranged on the inner side of the handle, and the third mounting block is provided with a third mounting hole.

Preferably, an elongated groove is provided in a middle of the rod portion.

Preferably, the rod portion, the handle, and the ball holder are integrally formed, and the rod portion is of a streamlined configuration.

Preferably, the ball holder is of a hemispherical structure, and arc protrusions are evenly distributed on an edge of the ball holder.

Preferably, two counterweights each made of a metal material having a relatively high specific weight are provided.

Preferably, a first mounting column for engaging with the first mounting hole is arranged on an inner side of the first slip-proof shell; and a second mounting column for engaging with the second mounting hole is arranged on an inner side of the second slip-proof shell.

Preferably, a third mounting column for engaging with the third mounting hole is arranged on an inner side of the streamlined casing.

Compared with the prior art, the present disclosure has the following advantages.

In the present disclosure, the arrangement of the anti-releasing ring on the handle can prevent the throwing club from being thrown out of the hand when swung vigorously during use, and the arrangement of the slip-proof shell and the streamlined casing on the handle provides a better grip feeling and a better user experience. The arrangement of the counterweight in the handle improves the stability of the throwing club during throwing, so that the direction in which the pet ball is thrown can be controlled more easily compared with a throwing club without a counterweight. The present disclosure is of a simple structure and a skillful design, and has a long service life.

Figure 1:
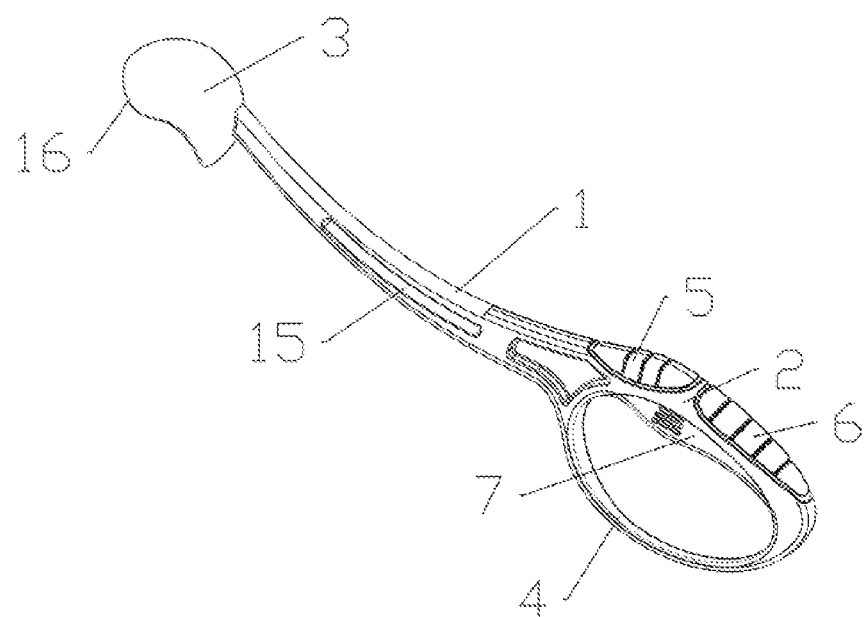
FIG. 1 is an overall schematic structural view of the present disclosure.

In the drawings: 1. rod portion; 2. handle; 3. ball holder; 4. anti-releasing ring; 5. first slip-proof shell; 6. second slip-proof shell; 7. streamlined casing; 8. counterweight; 9. first mounting block; 10. first mounting hole; 11. second mounting block; 12. second mounting hole; 13. third mounting block; 14. third mounting hole; 15. elongated groove; 16. arc protrusion; 17. first mounting column; 18. second mounting column; 19. third mounting column.

DETAILED DESCRIPTION OF THE EMBODIMENTS

In order to enable those skilled in the art to better understand the solutions of the present disclosure, the technical solutions in the embodiments of the present disclosure will be described clearly and fully with reference to the accompanying drawings in the embodiments of the present disclosure.

Figure 2:
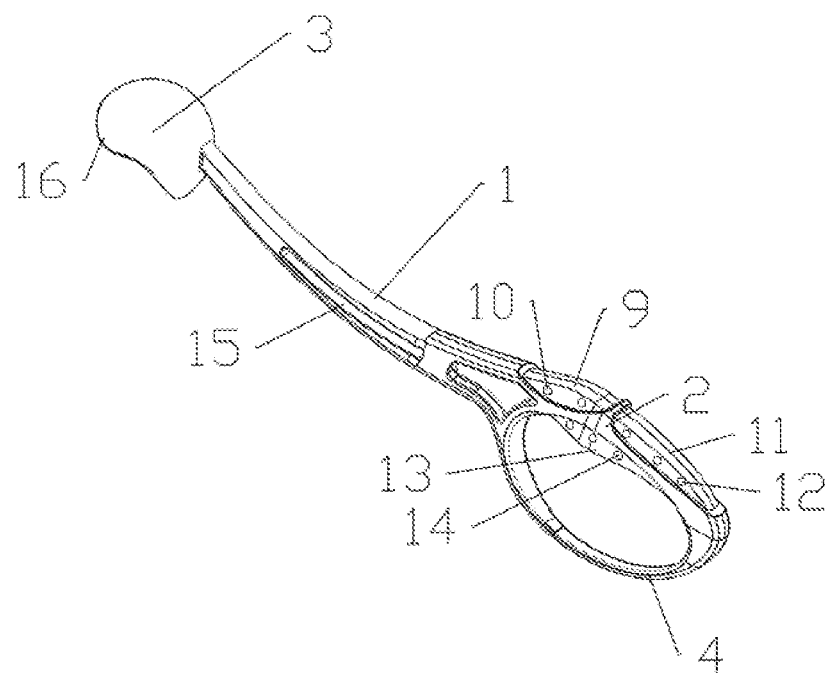
FIG. 2 is a schematic structural view of a rod portion, a handle, and a ball holder of the present disclosure.
Figure 3:
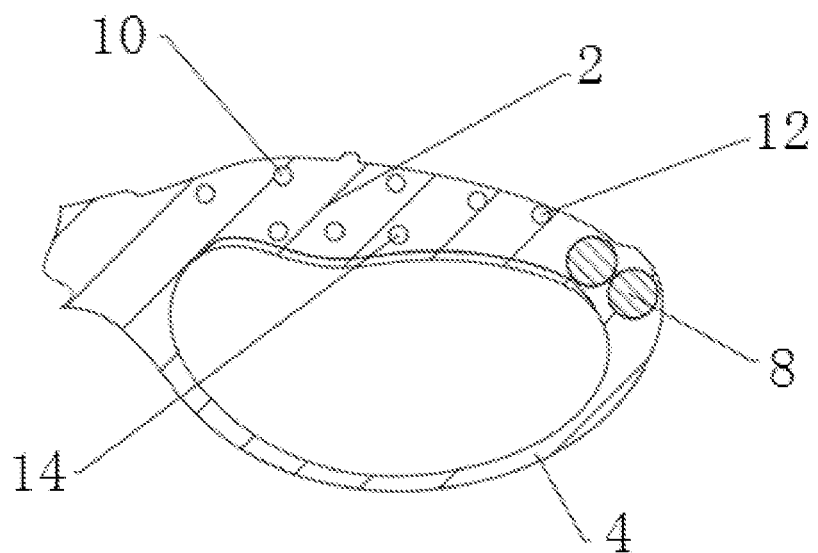
FIG. 3 is a schematic structural view of the handle of the present disclosure.
Figure 4:
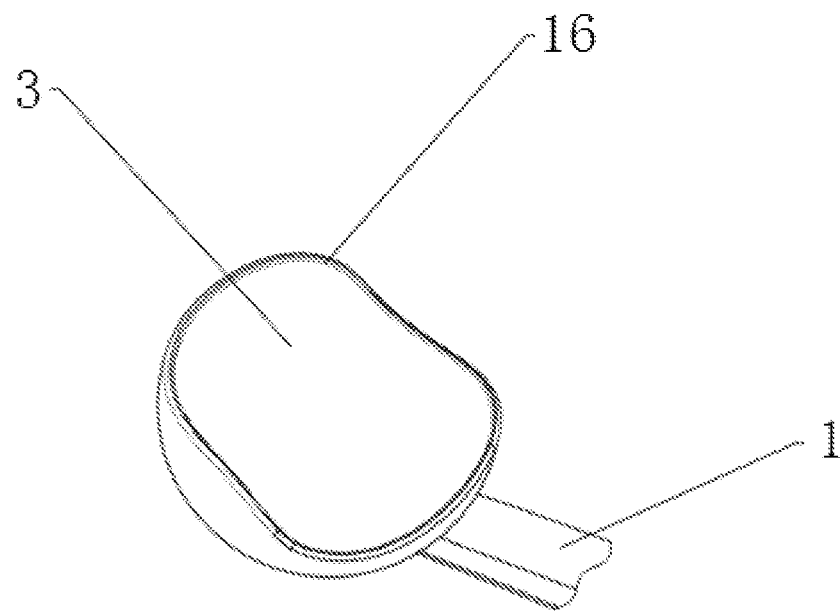
FIG. 4 is a schematic structural view of the ball holder of the present disclosure.
Figure 5:
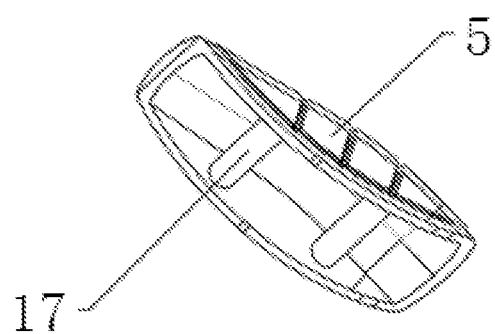
FIG. 5 is a schematic structural view of a first slip-proof shell of the present disclosure.
Figure 6:
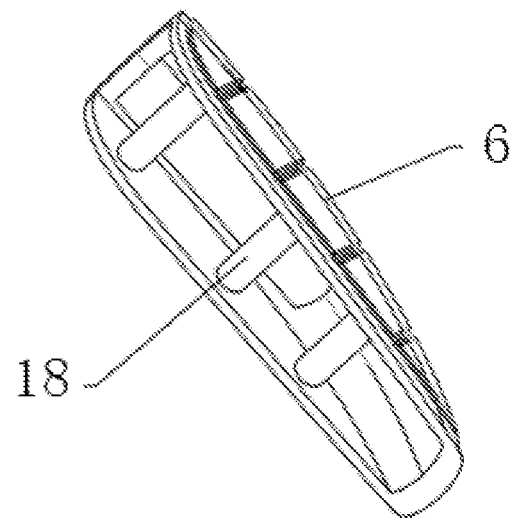
FIG. 6 is a schematic structural view of a second slip-proof shell of the present disclosure.
Figure 7:
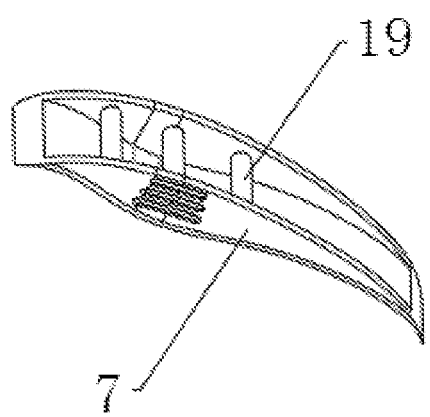
FIG. 7 is a schematic structural view of a streamlined casing of the present disclosure.

As shown in FIG. 1 to FIG. 2, a throwing club with a counterweight at a handle thereof includes a rod portion 1, the handle 2 and a ball holder 3. A first end of the rod portion 1 is connected to the handle 2. The ball holder 3 is arranged on a second end of the rod portion 1. The ball holder 3 is configured to hold a pet ball. An anti-releasing ring 4 is arranged on the handle 2. A first slip-proof shell 5 and a second slip-proof shell 6 are arranged on an outer side of the handle 2. The first slip-proof shell 5 and the second slip-proof shell 6 are used for preventing the handle 2 from slipping out of the hand when the user throws the pet ball with a great force. A streamlined casing 7 for improving the comfort during gripping is arranged on an inner side of the handle 2. The counterweight 8 is arranged inside an end of the handle 2 away from the rod portion 1. The counterweight 8 is used for improving the stability during throwing.

Further, a first mounting block 9 for mounting the first slip-proof shell 5 is arranged on the outer side of the handle 2, and the first mounting block 9 is provided with a first mounting hole 10; and a second mounting block 11 for mounting the second slip-proof shell 6 is arranged on a side of the first mounting block 9, and the second mounting block 11 is provided with a second mounting hole 12.

Further, a third mounting block 13 for mounting the streamlined casing 7 is arranged on the inner side of the handle 2, and the third mounting block 13 is provided with a third mounting hole 14.

Further, an elongated groove 15 is provided in a middle of the rod portion 1. The elongated groove 15 can reduce the weight of the rod portion 1.

Further, the rod portion 1, the handle 2, and the ball holder 3 are integrally formed, and the rod portion 1 is of a streamlined configuration.

Further, the ball holder 3 is of a hemispherical structure, and arc protrusions 16 are evenly distributed on an edge of the ball holder 3. The arc protrusions 16 are configured for clamping the pet ball inside the ball holder 3.

Further, two counterweights 8 are provided, each of which is made of a material having a relatively high specific weight. When the throwing club is swung to throw the pet ball, the ball holder 3 moves forward. When the throwing club is stopped, the ball holder 3 stops moving, and under the inertial force, the pet ball flies out of the ball holder 3. During this process, the counterweight 8 moves in a direction opposite to the movement direction of the ball holder 3, so that the stability is improved during throwing the pet ball, making it easier to control the throwing action.

Further, a first mounting column 17 for engaging with the first mounting hole 10 is arranged on an inner side of the first slip-proof shell 5. The engagement of the first mounting column 17 with the first mounting hole 10 prevents the first slip-proof shell 5 from falling off. A second mounting column 18 for engaging with the second mounting hole 12 is arranged on an inner side of the second slip-proof shell 6. The engagement of the second mounting column 18 with the second mounting hole 12 prevents the second slip-proof shell 6 from falling off.

Further, a third mounting column 19 for engaging with the third mounting hole 14 is arranged on an inner side of the streamlined casing 7. The engagement of the third mounting column 19 with the third mounting hole 14 prevents the streamlined casing 7 from falling off.

Working principles: When the throwing club is swung to throw the pet ball, the ball holder 3 moves forward. When the throwing club is stopped, the ball holder 3 stops moving, and under the inertial force, the pet ball flies out of the ball holder 3. During this process, the counterweight 8 moves in a direction opposite to the movement direction of the ball holder 3, so that the inertial force is increased during throwing the pet ball, allowing the pet ball to fly farther. In addition, the weight of the counterweight 8 and the weight of the ball holder 3 that holds the pet ball are more balanced, making it easier to control the direction of throwing. Furthermore, the anti-releasing ring 4 on the handle 2 can also ensure that the throwing club will not fly out of the hand when the user throws the pet ball with a great force.

It should be understood that the above embodiments are only example embodiments for illustrating the principles of the present disclosure, but the present disclosure is not limited thereto. Those having ordinary skill in the art can make various changes and modifications without departing from the spirit and scope of the present disclosure. Such changes and modifications also fall within the protection scope of the present disclosure.

What is claimed is:

1. A throwing club with a counterweight at a handle of the throwing club, the throwing club comprising a rod portion, the handle, and a ball holder, wherein
   a first end of the rod portion is connected to the handle,
   the ball holder is arranged on a second end of the rod portion,
   an anti-releasing ring is arranged on the handle,
   a slip-proof shell is arranged on an outer side of the handle,
   a streamlined casing for improving comfort during gripping is arranged on an inner side of the handle,
   a mounting block is arranged on the inner side of the handle,
   the streamlined casing is mounted on the mounting block,
   the mounting block includes a protrusion that protrudes towards the anti-releasing ring,
   the counterweight is arranged inside an end of the handle,
   the end of the handle is away from the rod portion, and
   when the throwing club is oriented horizontally and parallel to a horizontal axis, the counterweight is aligned with the protrusion of the mounting block along a-the horizontal axis.

2. The throwing club according to claim 1, wherein the mounting block is a third mounting block and wherein
   the slip-proof shell comprises a first slip-proof shell and a second slip-proof shell,
   a first mounting block for mounting the first slip-proof shell is arranged on the outer side of the handle,
   the first mounting block is provided with a first mounting hole,
   a second mounting block for mounting the second slip-proof shell is arranged on a side of the first mounting block, and
   the second mounting block is provided with a second mounting hole.

3. The throwing club according to claim 1, wherein
   the mounting block is provided with a third mounting hole.

4. The throwing club according to claim 1, wherein
   an elongated groove is provided in a middle of the rod portion.

5. The throwing club according to claim 1, wherein
   the rod portion, the handle, and the ball holder are integrally formed, and
   the rod portion is of a streamlined configuration.

6. The throwing club according to claim 1, wherein
   the ball holder is of a hemispherical structure, and
   arc protrusions are evenly distributed on an edge of the ball holder.

7. The throwing club according to claim 1, wherein two counterweights each made of a metal material are provided.

8. The throwing club according to claim 2, wherein
a first mounting column for engaging with the first mounting hole is arranged on an inner side of the first slip-proof shell, and
a second mounting column for engaging with the second mounting hole is arranged on an inner side of the second slip-proof shell.

9. The throwing club according to claim 3, wherein p1 a third mounting column for engaging with the third mounting hole is arranged on an inner side of the streamlined casing.

10. The throwing club according to claim 5, wherein
the ball holder is of a hemispherical structure, and
arc protrusions are evenly distributed on an edge of the ball holder.

* * * * *